United States Patent
Kaneda

(10) Patent No.: US 7,877,617 B2
(45) Date of Patent: Jan. 25, 2011

(54) ENERGY-SAVING MODE-EQUIPPED APPARATUS, INFORMATION PROCESSING APPARATUS, AND CONTROL METHOD

(75) Inventor: Takeshi Kaneda, Yokohama (JP)

(73) Assignee: Canon Kabushiki Kaisha (JP)

( * ) Notice: Subject to any disclaimer, the term of this patent is extended or adjusted under 35 U.S.C. 154(b) by 906 days.

(21) Appl. No.: 11/696,178

(22) Filed: Apr. 3, 2007

(65) Prior Publication Data
US 2007/0247467 A1   Oct. 25, 2007

(30) Foreign Application Priority Data
Apr. 21, 2006   (JP) .............................. 2006-118440

(51) Int. Cl.
*G06F 1/00*   (2006.01)
*G06F 1/26*   (2006.01)
*G06F 1/32*   (2006.01)

(52) U.S. Cl. ...................... 713/300; 713/320
(58) Field of Classification Search ................. 713/300, 713/320
See application file for complete search history.

(56) References Cited

U.S. PATENT DOCUMENTS

| | | | | |
|---|---|---|---|---|
| 6,128,747 | A * | 10/2000 | Thoulon | 713/330 |
| 6,622,251 | B1 * | 9/2003 | Lindskog et al. | 713/300 |
| 7,188,236 | B2 * | 3/2007 | Martinez et al. | 713/1 |
| 7,325,151 | B2 * | 1/2008 | Maruichi et al. | 713/323 |
| 7,478,188 | B2 * | 1/2009 | Patton | 710/300 |
| 2003/0053112 | A1 | 3/2003 | Motosugi et al. | |
| 2005/0154870 | A1 * | 7/2005 | Martinez et al. | 713/2 |
| 2006/0206737 | A1 * | 9/2006 | Lee | 713/320 |
| 2007/0130484 | A1 * | 6/2007 | Martinez et al. | 713/300 |

FOREIGN PATENT DOCUMENTS

| | | |
|---|---|---|
| JP | 2004-1241 A | 1/2004 |
| JP | 2004-78267 A | 3/2004 |
| JP | 2004-118240 A | 4/2004 |
| JP | 2004-164309 A | 6/2004 |
| JP | 2006-039940 A | 2/2006 |

OTHER PUBLICATIONS

Office action issued in corresponding Japanese application No. 2006-118440, dated Jun. 20, 2008.
Office Action issued in corresponding Chinese application No. 200710104427.6, dated Oct. 17, 2008.

* cited by examiner

*Primary Examiner*—Mark Connolly
(74) *Attorney, Agent, or Firm*—Rossi, Kimms & McDowell LLP

(57) ABSTRACT

An energy-saving mode-equipped apparatus for implementing an energy-saving mode for limiting power supply to modules notifies an information specifying a restore time from the energy-saving mode to an information processing apparatus connected via a network before switching into the energy-saving mode. The information processing apparatus transmits a processing request to the energy-saving mode-equipped apparatus after the restore time has elapsed since a launch request was transmitted to the energy-saving mode-equipped apparatus.

9 Claims, 17 Drawing Sheets

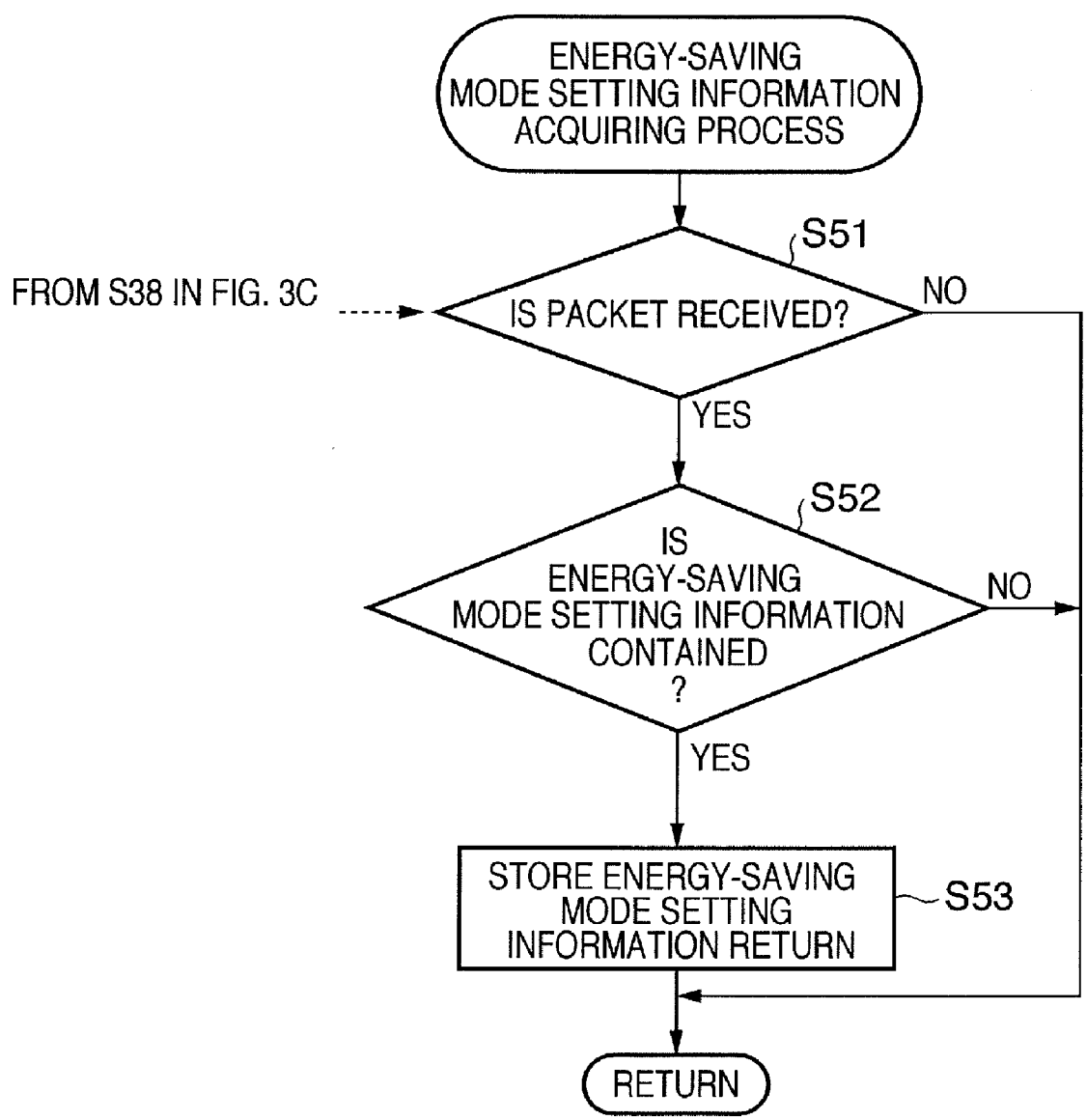

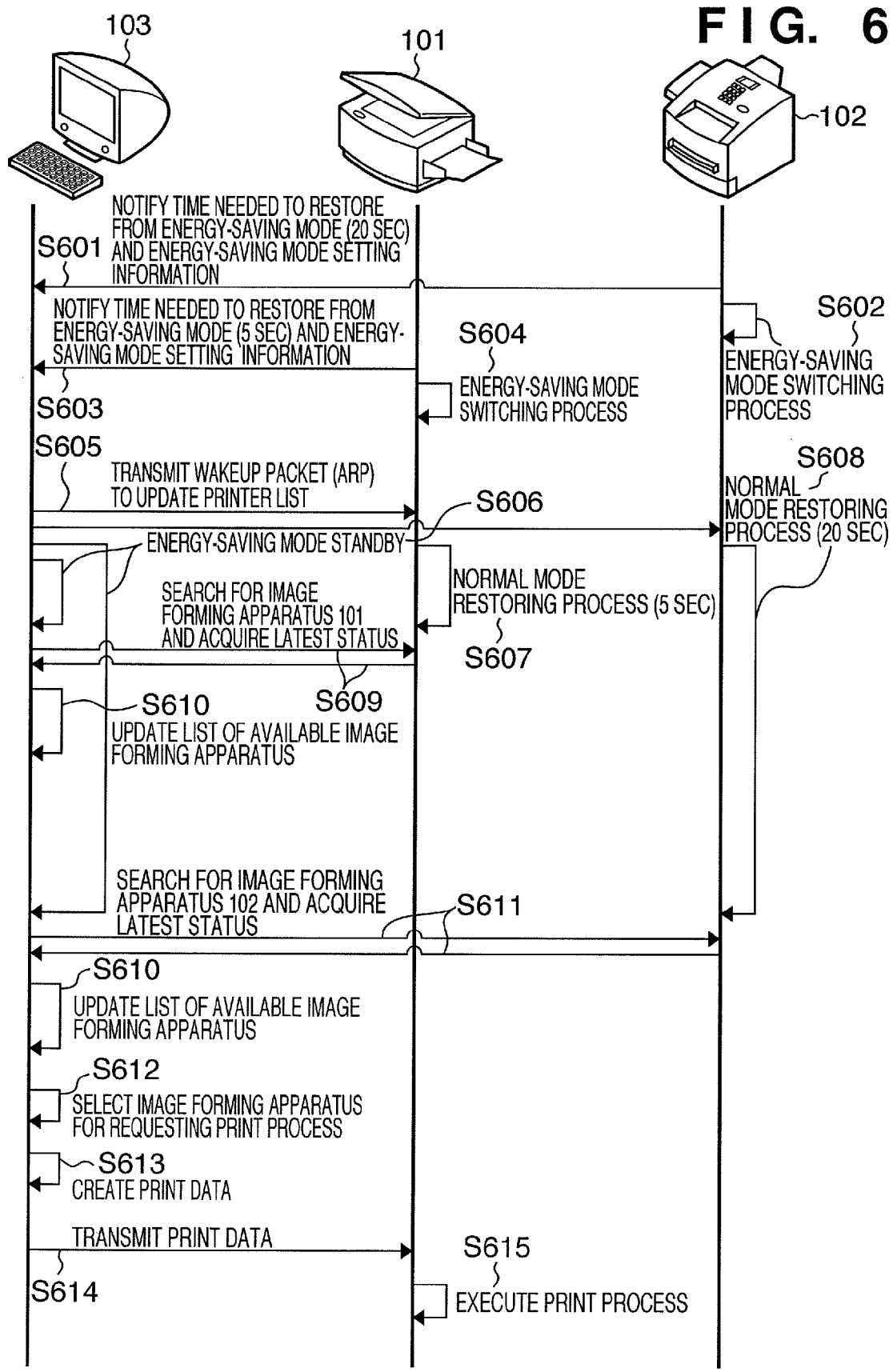

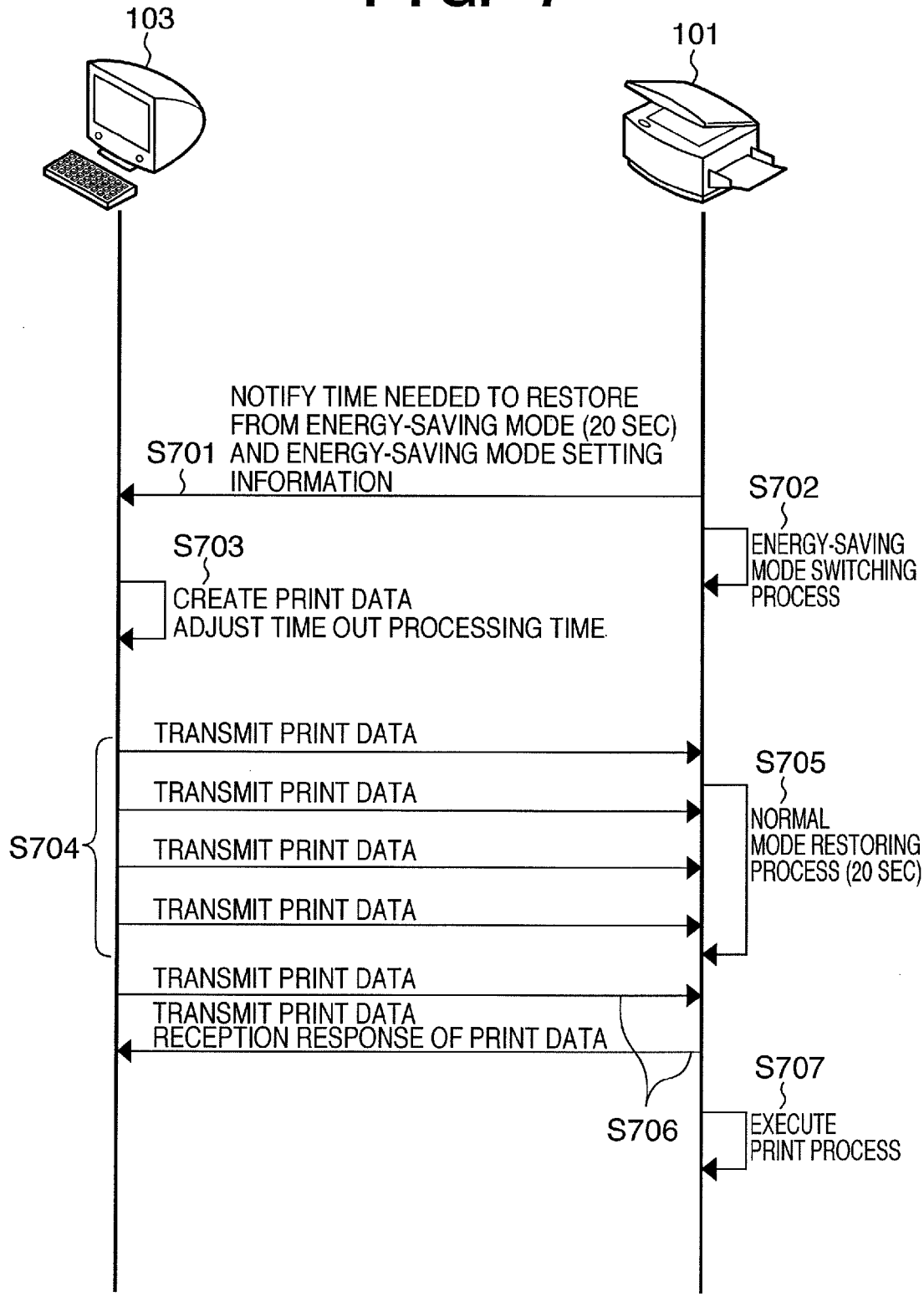

```
<?xml version='1.0' ?>
<envEnvelope xmlns :env="http://www.w3.org/2003/05/soap-envelope">
  <envBody>
<postDevicePowerSavingInfo Request
        SOAP-ENV:encodingStyle="http://schemas.xmlsoap.org/soap/encodung/">
    <user_config_info>
xsi:type="ns2:powerSavingSettingInfoType"
xmlns:ns2="http://www.eanon.com/ns/active/ActivePrinterListService" >
      <sleep_level xsi:type="xsd:int">8</sleep_level>
      <fui_wtime xsi:type="xsd:int">180</fui_wtime>
      <net_wtime xsi:type="xsd:int">600</net_wtime>
    </user_config_info>

<block_option xsi:type="ns2:powerSavingBlockOptionListType" />

<function_spec xsi:type="ns2:powerSavingFunctionSpec">
      <allowed_sleep_level xsi:type="xsd:int">8</allowed_sleep_level>
      <awake_up_time xsi:type="xsd:int">15</wake_up_time>
    </function_spec>
</postDevicePowerSavingInfo Request>
</envBody>
</envEnvelope>
```

801 (user_config_info block)
802 (block_option)
803 (function_spec block)

810

```
<?xml version='1.0' ?>
<envEnvelope xmlns :env="http://www.w3.org/2003/05/soap-envelope">
  <envBody>
<postDevicePowerSavingInfo Response
        SOAP-ENV:encodingStyle="http://schemas.xmlsoap.org/soap/encodung/">
    <result xsi:type="xsd:int">0</result>
</postDevicePowerSavingInfo Response>
</envBody>
</envEnvelope>
```

```
<?xml version='1.0' ?>
<envEnvelope xmlns :env="http://www.w3.org/2003/05/soap-envelope">
 <envBody>
<getDeviceStatus Request
        SOAP-ENV:encodingStyle="http://schemas.xmlsoap.org/soap/encodung/">

<request_status_list enc:arrayType="ns1:string[2]"
        xmlns:ns1="http://www.w3.org/2001/XMLSchema" xsi:type="enc:Array" >
      <item xsi:type="xsd:string">job_service</item>
      <item xsi:type="xsd:string">printer_component</item>
    </request_status_list>

</getDeviceStatus Request>
</envBody>
</envEnvelope>
```
 901

910

```
<?xml version='1.0' ?>
<envEnvelope xmlns :env="http://www.w3.org/2003/05/soap-envelope">
 <envBody>
  <getDeviceStatus Response
        SOAP-ENV:encodingStyle="http://schemas.xmlsoap.org/soap/encodung/">

<job_service xsi:type="xsd:string">Ready </job_service>
    <printer_component >Idle </printer_component>

</getDeviceStatus Response>
</envBody>
</envEnvelope>
```
 911

MIME-Version:1.0
POST /Print HTTP /1.1
Host:192.168.0.1
Content-Type:Multipart/Related;boundary=MIME_boundary;type=text/xml;         ⎫
     start="<http://192.168.0.1/msg.xml>"                                    ⎬ 1001
Content-Length:XXXX                                                          ⎪
SOAP Action:                                                                 ⎪
Content-Description:PrintData                                                ⎭

--MIME_boundary
Content-Type:text/xml;charset=UTF-8
Content-Transfer-Encoding:8bit
Content-ID:<http://192.168.0.1/msg.xml>

<soapEnvelope xmlns:soap='http://www.w3.org/2002/12/soap-envelope'
              xmlns:xbinc='http://schemas.xmlsoap.org/2003/03/xbinc' >
  <soap:Header>
    <xbinc:Doinclude
        soap:role='http://www.w3.org/2002/12/soap-envelope/role/next'
        soap:mustUnderstand='false'
        soap:relay='true' />
  </soap:Header>
  <soap:Body>                                                                    ⎫
    <m:data xmlns:m='http://www.eanon.com/ns/active/PrintService'                ⎪
        xmlns:swa='http://schemas.xmlsoap.org/2003/03/swa'                       ⎪
        xmlns:xbinc='http://schemas.xmlsoap.org/2003/03/xbinc' >                 ⎪
      <m:printData swa:MediaTyype='image/png'>                                   ⎬ 1002
        <xbinc:include href='cid:http://192.168.0.1/test01.png' />               ⎪
      </m:printData>                                                             ⎪
      <m:printDataSig swa:MediaType='application/pkcs7-signature' >              ⎪
        <xbinc:include href='cid:http://192.168.0.1/test01.hsh' />               ⎪
      </m:printDataSig>                                                          ⎭
    </m:data>
  </soap:Body>
</soap:Envelope>

--MIME_boundary                                                              ⎫
Content-Type:image/png                                                       ⎪
Content-Transfer-Encoding:binary                                             ⎬ 1003
Content-ID:<http://print-service/test01.png>                                 ⎪
                                                                             ⎪
fd a5 8a 29 aa 46 1b 24                                                      ⎭

--MIME_boundary
Content-Type:application/pkcs7-signature
Content-Transfer-Encoding:binary
Content-ID:<http:/192.168.0.1/test01.hsh>

15 a6 bb bd 13 a2 d9 54 ........

--MIME_boundary--
```

ENERGY-SAVING MODE-EQUIPPED APPARATUS, INFORMATION PROCESSING APPARATUS, AND CONTROL METHOD

BACKGROUND OF THE INVENTION

1. Field of the Invention

The present invention relates generally to an energy-saving mode-equipped apparatus equipped with energy-saving mode, information processing apparatus, and control method, and more particularly to a printing system constituted by an image forming apparatus, a search utility, and a printing client. The image forming apparatus is equipped with an energy-saving mode for restoring from a stopped status to a standby status upon receiving a self-addressed packet from outside via a network.

2. Description of the Related Art

In recent years, there has been demand for equipping products which include image forming apparatuses with an energy-saving mode for suppressing power consumption of apparatuses in standby status. In network systems in which apparatuses equipped with an energy-saving mode are connected, it is sometimes the case that personal computers (PCs) and the like search through apparatuses whose energy-saving mode is enabled for a connection status or operation status of the apparatuses via the network. In such cases, PCs cancel the energy-saving mode of the apparatus by transmitting a launch packet for launching and then transmit a search packet for searching to the apparatuses (see Japanese Patent Application Laid-Open No. 2006-39940).

However, the greater the effectiveness of the energy-saving mode, the greater the number of modules in the product to which power supply is stopped. Accordingly, a long time is required to restore from energy-saving mode. Furthermore, since a function of the energy-saving mode is intimately related with the hardware modules and software modules constituting a product, the restore time of each model (and even for the same model, depending on the level of energy-saving mode set by the user) differs.

On this background, search clients (PCs) searching for the connection status and operation status of apparatuses on a network to which a plurality of apparatuses are connected, such as and office environment, cannot uniquely determine the time-out time, which is the upper limit of the search response time. For example, if the time-out time of the search client is set to a short time, apparatuses which are unable to restore from energy-saving mode within the time-out time will not be displayed in the search results. If the time-out time of the search client is set to a long time, time will be wasted determining that the apparatuses which are being searched for are not actually present.

SUMMARY OF THE INVENTION

The present invention provides a technology for an information processing apparatus to communicate with other apparatuses equipped with an energy-saving mode, allowing efficient communication by taking into consideration a restore time from the energy-saving mode, even if the other apparatuses are in the energy-saving mode.

An energy-saving mode-equipped apparatus according to one aspect of the present invention includes an energy-saving mode implementing unit for implementing an energy-saving mode for limiting power supply to a module, a notification unit for notifying an information for specifying a restore time from the energy-saving mode to an information processing apparatus connected via a network before switching into the energy-saving mode, a restoring unit for starting restoring from the energy-saving mode in response to reception of data sent from the information processing apparatus, and an executing unit for executing a process in response to a request from the information processing apparatus after restoring from the energy-saving mode.

An information processing apparatus according to another aspect of the present invention includes a receiving unit for receiving an information for specifying a restore time from an energy-saving mode from an energy-saving mode-equipped apparatus having the energy-saving mode for limiting power supply to a module, a storing unit for storing the energy-saving mode-equipped apparatus and the restore time from the energy-saving mode of the energy-saving mode-equipped apparatuses based on the information received by the receiving unit, a first transmitting unit for transmitting data to the energy-saving mode-equipped apparatus, and a second transmitting unit for transmitting a processing request to the energy-saving mode-equipped apparatus based on the restore time from the energy-saving mode stored in the storing unit after the data was transmitted by the first transmitting unit.

A control method for an energy-saving mode-equipped apparatus according to still another aspect of the present invention includes an energy-saving mode implementing step of implementing an energy-saving mode for limiting power supply to modules, a notification step of notifying an information for specifying a restore time from the energy-saving mode to an information processing apparatus connected via a network before switching into the energy-saving mode, a restoring step of starting restoring from the energy-saving mode in response to reception of data sent from the information processing apparatus, and an executing step of executing a process in response to a request from the information processing apparatus after restoring from the energy-saving mode.

A control method for an information processing apparatus according to still another aspect of the present invention includes a receiving step of receiving an information for specifying a restore time from an energy-saving mode from an energy-saving mode-equipped apparatus having the energy-saving mode for limiting power supply to a module, a storing step of storing the energy-saving mode-equipped apparatus and the restore time from the energy-saving mode of the energy-saving mode-equipped apparatus based on the information received in the receiving step, a first transmitting step of transmitting data to the energy-saving mode-equipped apparatus, and a second transmitting step of transmitting a processing request to the energy-saving mode-equipped apparatus based on the restore time from the energy-saving mode stored in the storing step after the data was transmitted in the first transmitting step.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 5B is a flowchart for explaining an energy-saving setting information acquiring process of the search/print client (PC) shown in FIG. 1.

FIG. 6 is a view showing a sequence of a search process using a notified restore time of the present embodiment.

FIG. 7 is a view showing a sequence of a printing process using a notified restore time of the present embodiment.

FIG. 8 is a view showing a SOAP/XML message in a case in which the image forming apparatus shown in FIG. 1 notifies an energy-saving setting information to the search/print client.

FIG. 9 is a view showing a SOAP/XML message in a case in which the search/print client shown in FIG. 1 requests a latest status information to the image forming apparatus.

FIG. 10 is a view showing a SOAP/XML message in a case in which the search/print client shown in FIG. 1 transfers print data to the image forming apparatus.

DESCRIPTION OF THE EMBODIMENTS

A detailed description will be given of embodiments of the present invention with reference to the drawings. While the present embodiment will be described using as an example a system in which are connected to network a personal computer (PC) as a client apparatus and an image forming apparatus as an energy-saving mode-equipped apparatus, the present invention is not limited to this. The image forming apparatus is illustrated as a typical apparatus with a relatively long restore time from an energy-saving mode, and having a plurality of energy-saving modes with differing restore times. Accordingly, the present invention is applicable to other apparatuses having other energy-saving modes, which are also included in the present invention.

Figure 1:
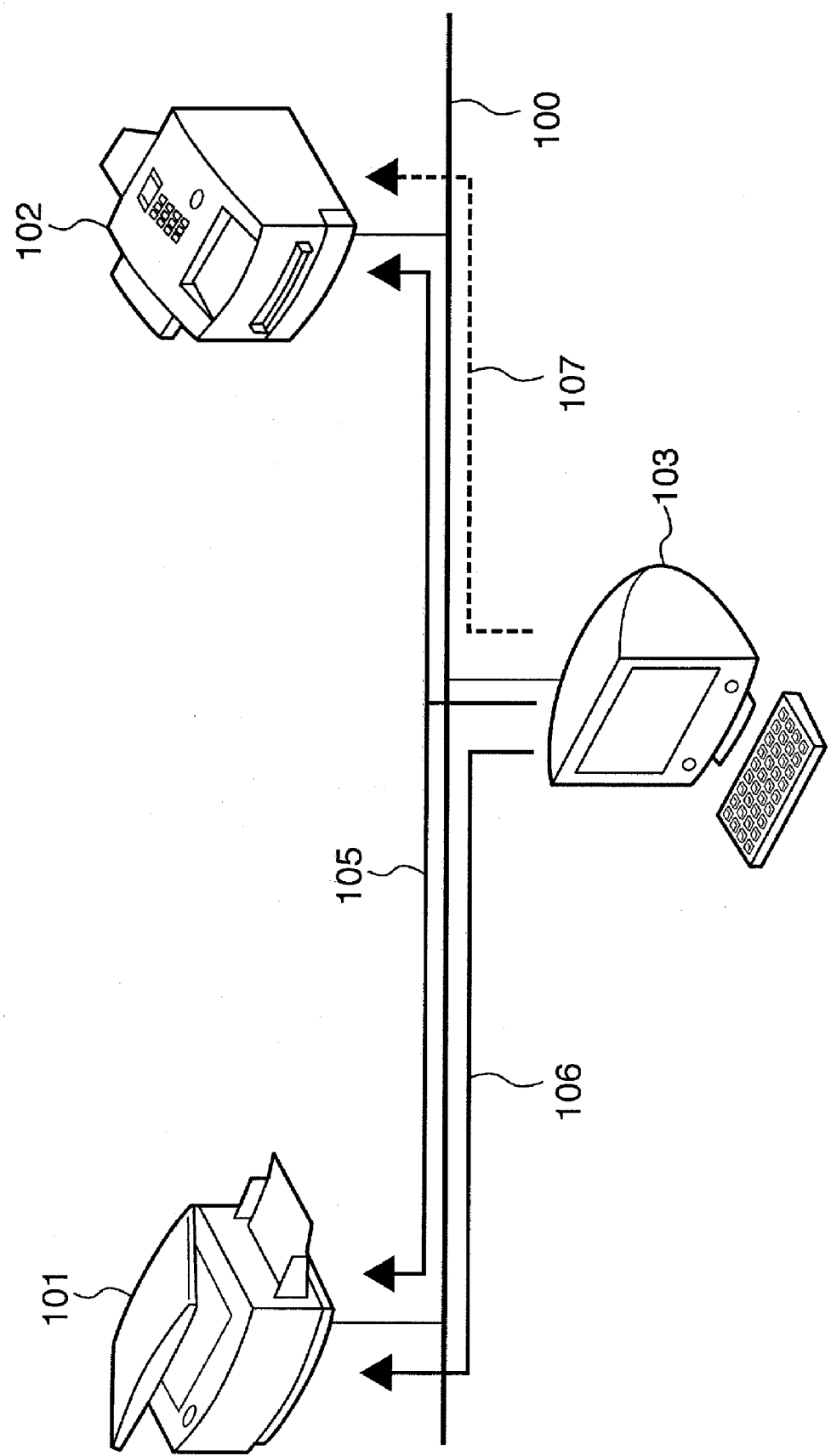
FIG. 1 is a schematic diagram of a system including an image forming apparatus and a search/print client as one aspect of the present invention.

System Constitution Including Energy-Saving Mode-Equipped Apparatus of the Present Embodiment FIG. 1 is a view of a network constitution according to the present embodiment.

Image forming apparatuses 101 and 102 are connected to a network 100. A client apparatus 103 is connected to the network 100, and can perform searching and printing with the image forming apparatuses 101 and 102. The image forming apparatuses 101 and 102 are equipped with energy-saving modes. The image forming apparatuses 101 and 102 restore to a normal mode from the energy-saving mode by receiving an ARP (Address Resolution Protocol) packet 105 from the network 100, as well as by being directly operated via an operation panel or the like. The image forming apparatuses 101 and 102 also restore to the normal mode from the energy-saving mode by receiving self-addressed packets 106 and 107.

Constitution of the Image Forming Apparatuses of the Present Embodiment

Figure 2A:
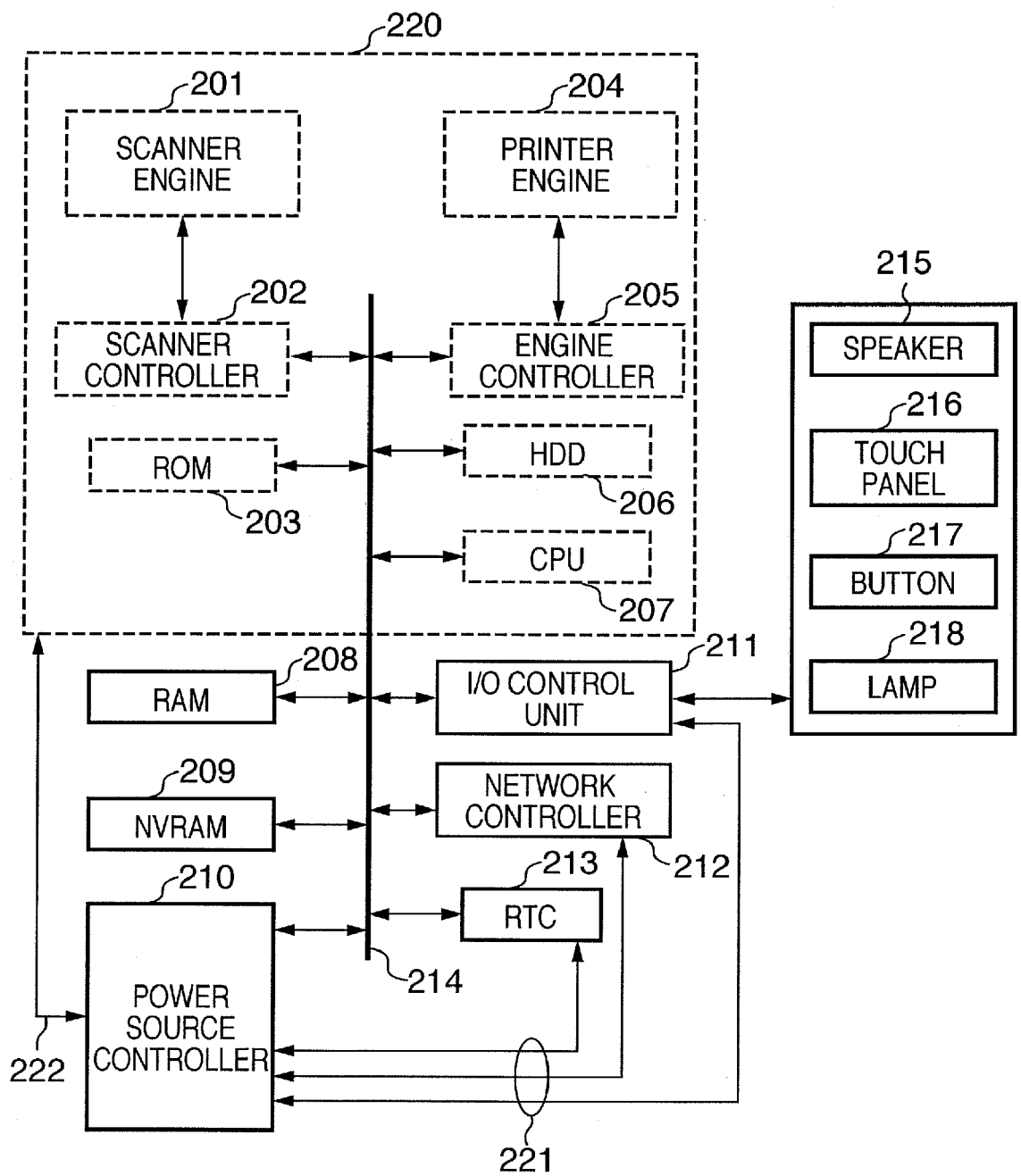
FIG. 2A is a schematic block diagram of hardware of the image forming apparatus shown in FIG. 1.

FIG. 2A is a block diagram of the image forming apparatuses in the present embodiment. In the present embodiment, the image forming apparatus is a multifunction peripheral having a printing function and a scanning function, but may be printers, scanners, faxes, copiers, or other apparatuses.

A scanner controller 202 controls a scanner engine 201. An engine controller 205 controls a printer engine 204. A ROM 203 stores fixed programs such as a boot program and fixed parameters. A hard disk drive (HDD) 206 stores programs and data. A CPU 207 is a CPU for computational control for controlling the image forming apparatuses by executing programs. A RAM 208 is used as a temporary storage unit by the CPU 207. An NVRAM 209 is a non-volatile RAM for holding values set through a panel, etc.

An I/O control unit 211 controls a speaker 215, a touch panel 216, a button 217, a lamp 218, and other portions of a user interface unit. A network controller 212 controls communication via the network 100. An RTC 213 is a real time clock, operates even in the energy-saving mode, and notifies the restore time to a power source controller 210. A bus 214 connects the above-mentioned elements.

The programs for controlling the image forming apparatus are mainly stored in the HDD 206. When the power is turned on, the CPU 207 reads the boot program from the ROM 203 and boots the image forming apparatus based on the control of the boot program. The CPU 207 places control programs for the image forming apparatus from the HDD 206 to the RAM 208 based on the boot program, and controls the image forming apparatus by reading the control programs for the image forming apparatus placed in the RAM 208.

The energy-saving mode in the present embodiment is realized by the power source controller 210 stopping supply of the power source to those various functional units inside the broken-line frame 220. In other words, when the power source controller 210 stops the supply of power to the CPU 207 of the image forming apparatus, a greater energy savings effect can be achieved than when stopping the supply of power only to the scanner engine 201 and/or the printer engine 204. However, the time to restore from the energy-saving mode is longer than when stopping the supply of power only to the scanner engine 201 and/or the printer engine 204.

The power source controller 210 can receive a Power_On signal 221, which acts as a request to restore from the energy-saving mode, from the I/O control unit 211, the network controller 212, and the RTC 213, even when in the energy-saving mode. Upon receiving the Power_On signal 221, the power source controller 210 selects the needed modules from the units inside the broke-line frame 220, turns the power on, and restores from the energy-saving mode. The network controller 212 requests restoring from the energy-saving mode by generating the Power_On signal 221 when the network controller 212 receives data. The data received by the network controller 212 is, for example, a self-addressed network packet, an ARP packet, and so on. The I/O control unit 211 requests restoring from the energy-saving mode by generating the Power_On signal 221 when the user operates a touch panel 216 or a button 217.

(Storage Constitution of Image Forming Apparatus)

Figure 2B:
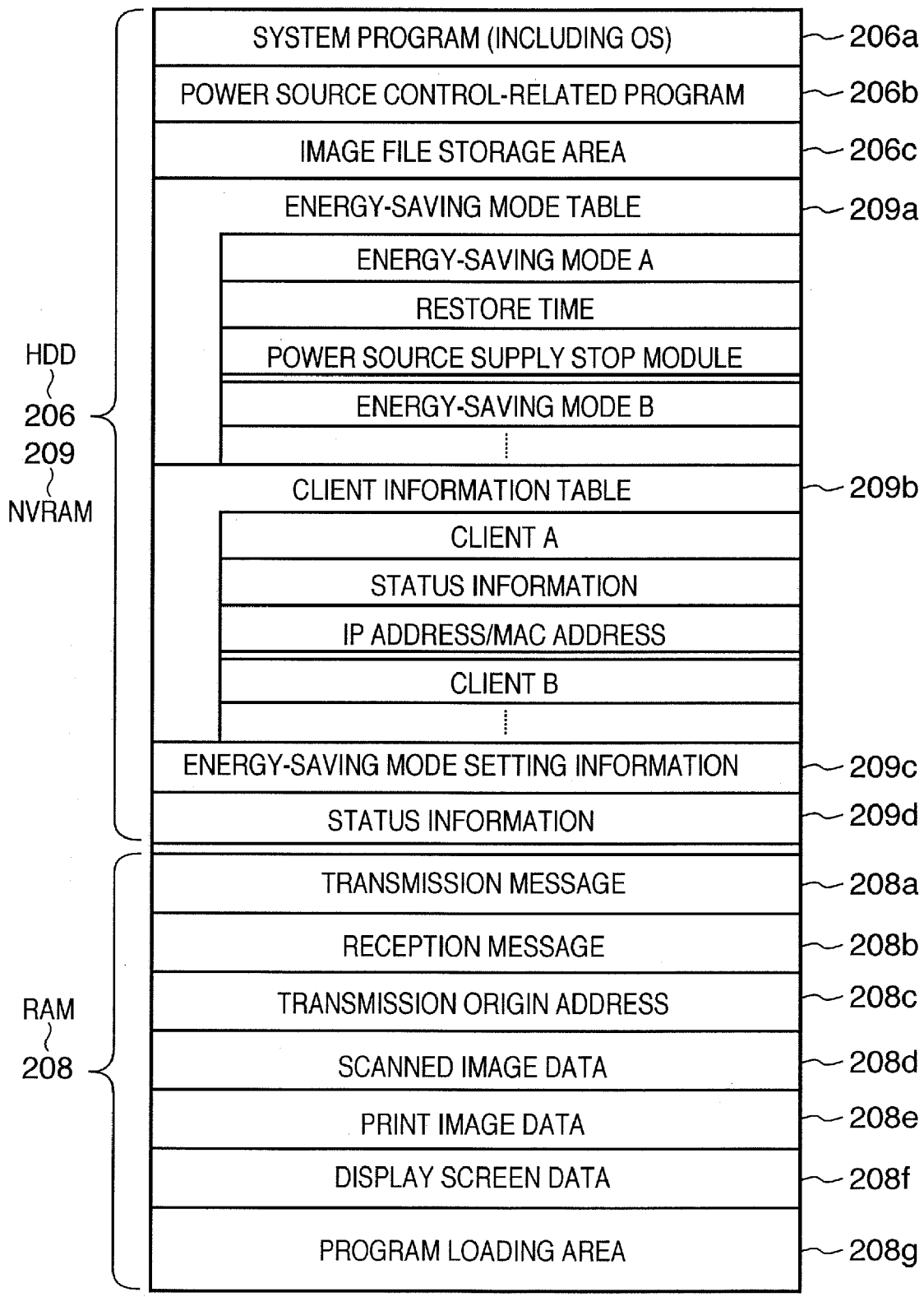
FIG. 2B is a schematic block diagram of a storage constitution of the memory shown in FIG. 2A.

FIG. 2B is a view of a storage constitution of the image forming apparatus of the present embodiment. FIG. 2B shows information stored in the HDD 206, the RAM 208, and the NVRAM 209 shown in FIG. 2A. In FIG. 2B, only programs and data related to the first and second embodiments are shown, while other programs and data are omitted. The arrangement of this information is not limited to the arrangement shown in FIG. 2B. Furthermore, the allocation to the HDD 206, the NVRAM 209, and the RAM 208 shown in FIG. 2B is only one example and not a limitation.

In FIG. 2B, 206*a* is system programs, including the OS and the like. 206*b* is power source control-related programs related to power source control executed by the CPU 207 and the power source controller 210. FIG. 3B and FIG. 3C show the content thereof. Programs executed in the energy-saving mode of the power source control-related programs 206*b* (when the CPU 207 and the HDD 206 are off) are preferably stored in the NVRAM 209. 206*c* is an image file storage area for holding image files to be processed by the image forming apparatus.

209*a* is an energy-saving mode table for storing the energy-saving modes implemented by the image forming apparatus. The energy-saving mode table stores the energy-saving modes implemented by the image forming apparatus (in FIG. 2B, energy-saving modes A and B, etc.) and data on the restore times thereof and modules to which power supply is stopped. 209*b* is a client information table for storing information on client apparatuses connected to the network. The client information table stores the client apparatuses (launched PCs connected to the network) which have sent ARP packets to the image forming apparatuses and PC status information and network addresses thereof, such as IP addresses or MAC addresses, etc.

209*c* is energy-saving mode setting information including identification information of energy-saving modes currently implemented by the image forming apparatuses and setting information related to energy savings set by the user using the touch panel 216 and the button 217. 209*d* is current status information for the image forming apparatuses. The status information includes information on, for example, whether or not an image forming apparatus is busy, information on whether or not functions with which an image forming apparatus is equipped can be used, and so on.

208*a* is a transmission message sent as a packet from the image forming apparatus to the client apparatus. 208*b* is a reception message sent as a packet from the client apparatus and received by the image forming apparatus. 208*c* is a transmission origin address extracted from the reception message 208*b*, and holds the client information table 209*b*.

208*d* is scanned image data read by the scanner engine 201. 208*e* is print image data output by the printer engine 204. 208*f* is display screen data such as an energy saving setting screen displayed to the touch panel 216 and the like. 208*g* is a program loading area for loading programs executed by the CPU 207 from the HDD 206.

Operation of the Image Forming Apparatus of the Present Embodiment (Software Constitution of the Image Forming Apparatus)

Figure 3A:
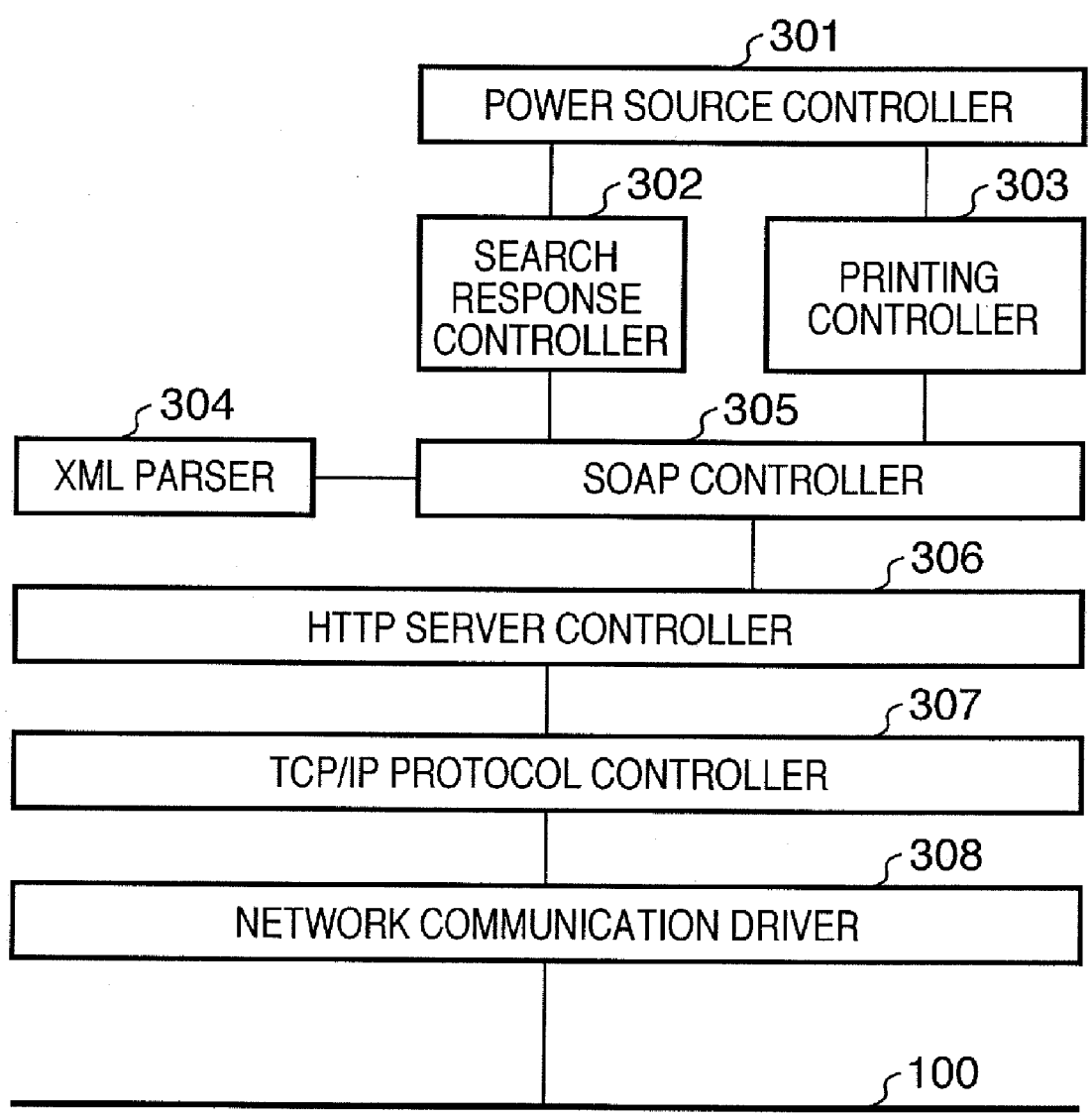
FIG. 3A is a schematic block diagram of software of the image forming apparatus shown in FIG. 1.
Figure 3B:
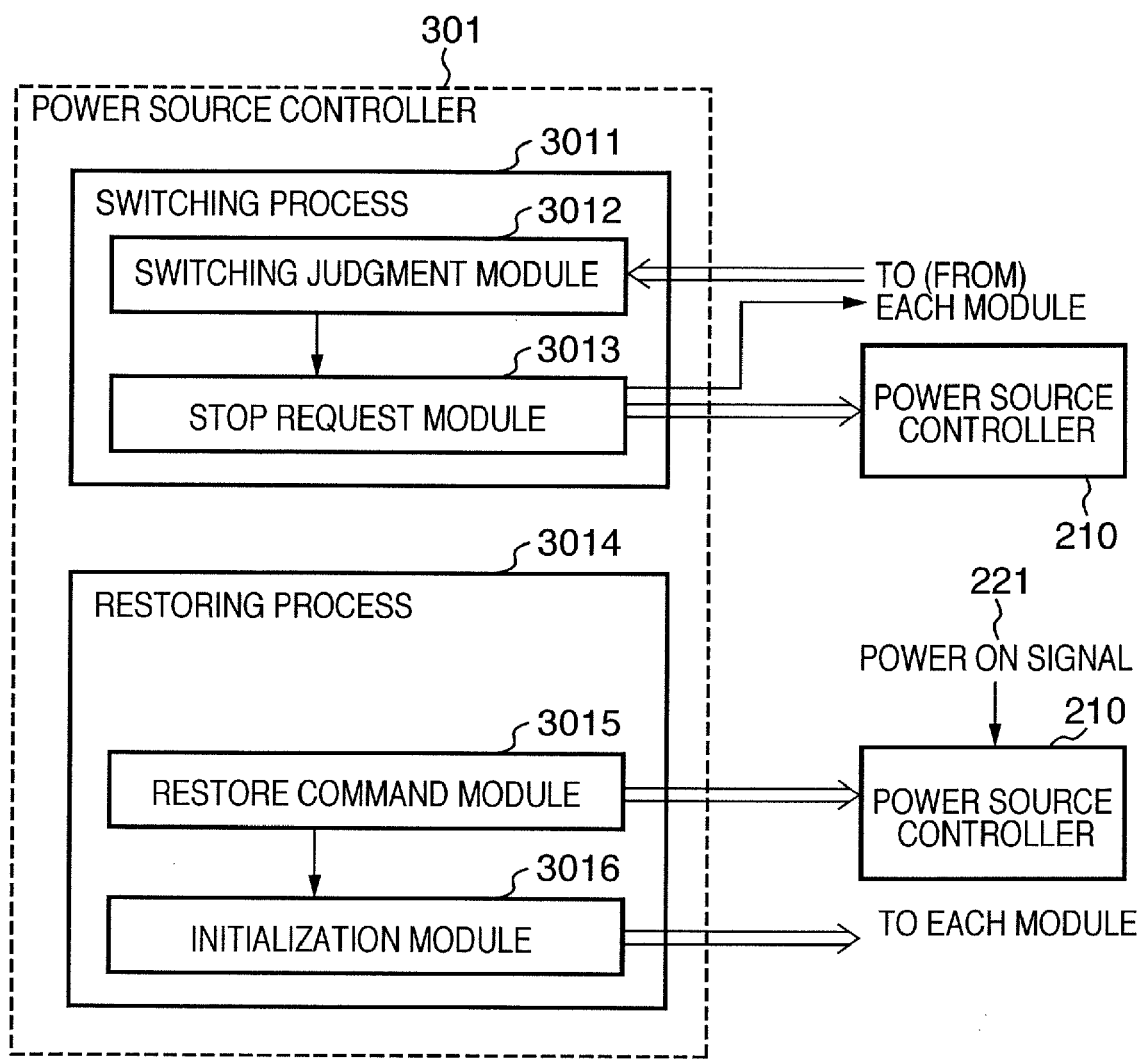
FIG. 3B is a view of the power source controller shown in FIG. 3A.
Figure 3C:
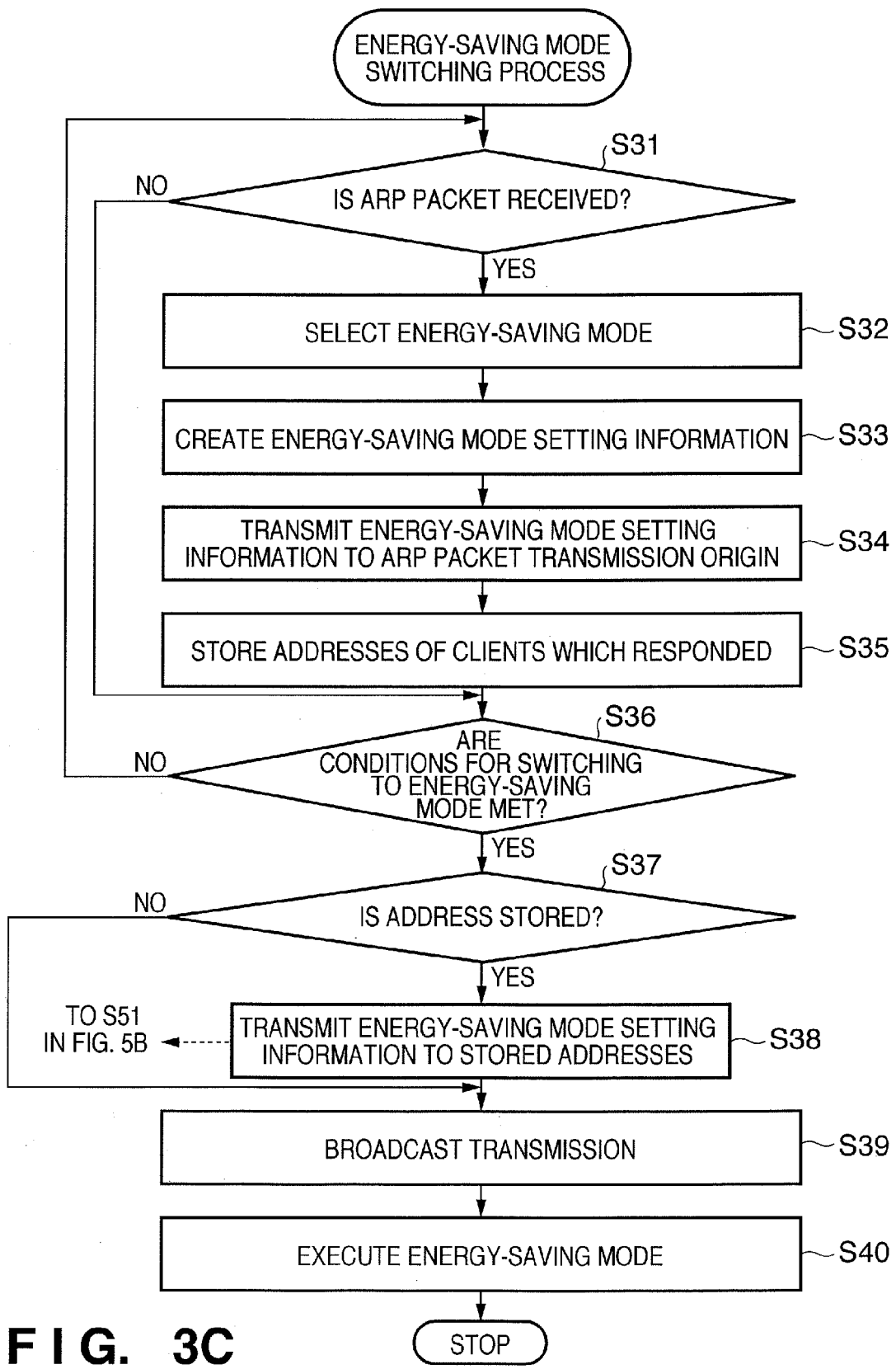
FIG. 3C is a flowchart for explaining an energy-saving mode switching process of the image forming apparatus shown in FIG. 1.

FIG. 3A and 3B are block diagrams of a constitution of software of the image forming apparatuses of the present embodiment.

A software-side power source controller 301 controls a process for switching to the energy-saving mode and a process for restoring from the energy-saving mode. As shown in FIG. 3B, the power controller 301 has a "switching process 3011" for controlling switching to the energy-saving mode from a normal mode and a "restoring process 3014" for controlling restoring to the normal mode from the energy-saving mode. Here, the "switching process 3011" includes a "switching judgment module 3012" for constantly monitoring each module and judging whether or not conditions for switching to the energy-saving mode have been met, and a "stop request module 3013" for requesting stopping hardware-dependent software when the conditions for switching to the energy-saving mode are met and stopping the supply of power to the hardware-side power source controller 210. Restoring by the "restoring process 3014" is started by restarting power supply by the hardware-side power source controller 210 detecting the restore conditions by the Power_On signal 221 and notifying the software-side power source controller 301 of this. The image forming apparatus restores from the energy-saving mode by the processing of a "restore command module 3015" for commanding restarting of power supply by the hardware-side power source controller 210 and an "initialization module 3016" for executing an initialization process for the stopped software.

Returning to FIG. 3A, the conditions for switching to the energy-saving mode differ depending on the user settings related to energy saving functionality and the types of optional parts attached to the image forming apparatus. If the switching conditions for switching to the energy-saving mode are met, the image forming apparatus transmits its own energy-saving mode setting information to each client apparatus via a search response controller 302. After notification of the energy-saving mode setting information is complete, applications dependent on hardware are commanded to stop, and once the stopping of the applications is complete, stoppage of power supply to the hardware-side power controller 210 is requested.

The search response controller 302 has three roles: (1) identifying client apparatuses for notification of the energy-saving mode setting information, (2) notifying the corresponding client apparatuses of the energy-saving mode setting information, and (3) notifying the status of the image forming apparatus after restoring from the energy-saving mode. The process of (1) identifying search clients (search client identifying process) is realized by transmitting energy-saving mode setting information 800 to ARP packet transmission origins and holding the MAC addresses of client apparatuses which return a response 810. (2) Notification of the energy-saving mode setting information is performed to the MAC addresses in the search client identifying process. Note that notification of the energy-saving mode setting information may be done not to specific client apparatuses, but by transmission to a plurality of addressees through broadcast transmission on a network, or both. The client apparatuses receiving the energy-saving mode setting information standby for the restore process time notified in the energy-saving mode setting information after transmission of the ARP packet. Thereafter, the client apparatuses can accurately return a status notice 910 to these apparatuses since a status acquisition message 900 is transmitted. Note that the transmitted/received message information described above is described below using FIG. 8 through FIG. 10.

A printing controller 303 acquires and processes print data from messages received from print clients and prints this using the engine controller 205.

A network communication driver 308 controls the network controller 212 thereby controlling data transmission/reception with the network. A TCP/IP protocol controller 307 includes modules for controlling TCP/IP protocol, and performs data transmission/reception control based on the TCP/IP protocol using the network communication driver 308. An HTTP server controller 306 is a module for controlling the entire protocol known as HTTP (HyperText Transfer Protocol). The HTTP server controller 306 performs appropriate processes by analyzing HTTP request packets received from clients and passes data to a SOAP controller 305, the printing controller 303, or other upper-level applications. The HTTP server controller 306 performs control for returning to clients HTTP response packets through commands from the upper-level applications.

The SOAP controller 305 is a module for controlling a protocol known as SOAP (Simple Object Access Protocol). The SOAP controller 305 analyzes data in XML (extensible Markup Language) format received from clients using an XML parser 304, and calls appropriate modules, such as the printing controller 303 and the search response controller 302. The SOAP controller 305 performs control for converting data to be returned to clients into XML data and returning this to clients via the HTTP server controller 306. The XML parser 304 is a module for inputting XML-format data and outputting analysis results.

(Operation of Image Forming Apparatus)

FIG. 3C is a flowchart showing a process for switching to energy-saving mode (an energy-saving mode switching process) of the image forming apparatus of the present embodiment.

First, in step S31 the CPU 207 determines whether or not the network controller 212 has received an ARP packet. If the network controller 212 has received an ARP packet, then the process moves to step S32. If the network controller 212 has not received an ARP packet, then the process moves to step S36. In step S32, the CPU 207 selects an energy-saving mode set in the image forming apparatus. For example, if the starting of image formation within a set amount of time is a condition, then energy-saving modes can have various conditions such as putting hot parts into standby (dropping a set temperature) if there is none for 10 minutes, or stopping rotating parts and shutting off power to controllers if there is none for 30 minutes.

In step S33, the CPU 207 creates the energy-saving mode setting information from the energy-saving mode table 209a according to the energy-saving mode settings in step S32. The energy-saving mode setting information includes at least the restore time it takes to restore from the set energy-saving mode. The restore time it takes to restore from energy-saving mode differs depending on the type of energy-saving mode. Accordingly, the CPU 207 calculates the restore time and creates the energy-saving mode setting information based on the set energy-saving mode. Note that in addition to the defaults stored at time of shipment for example, the energy-saving mode table 209a is newly created as described above, according to user settings related to the energy-saving mode function and the types of optional parts attached to the image forming apparatus.

In step S34, the CPU 207 transmits the energy-saving mode setting information created in step S33 to the PCs which are the transmission origin of the ARP packets via the network controller 212. In step S35, the CPU 207 acquires clients which responded to the transmission, or in other words MAC addresses (or IP addresses) of PCs running on the network, and holds this in the client information table 209 (i.e., stores the addresses).

In step S36, the CPU 207 determines whether or not the switching conditions for switching to the energy-saving mode are met. The switching conditions for switching to the energy-saving mode differ depending on the apparatus, parts, and types of optional parts attached at that time, and so on, but conditions could include, for example, that a command for image formation is not received or image formation does not start within a set time. These switching conditions may be such that the user can change or set them at will. In step S36, if the switching conditions are determined to have been met, the process moves to step S37, and if the switching conditions are determined not to have been met, the process returns to step S31.

In step S37, the CPU 207 determines whether or not the address of the client apparatus is registered (stored) in the client information table 209b stored in the HDD 206, etc. In other words, the CPU 207 determines whether or not the client apparatus stored in step S35 is present. In step S37, if the address of the client apparatus is determined to be stored, then the process moves to step S38, and if the address of the client apparatus is determined not to be stored, then the process moves to step S39.

In step S38, the CPU 207 transmits the energy-saving mode setting information to the address of the clients stored in step S35 via the network controller 212. In step S39, the CPU 207 transmits the energy-saving mode setting information using network broadcasting via the network controller 212. The energy-saving mode setting information transmitted in step S38 and step S39 is the energy-saving mode setting information created in step S33. Note that in step S38, if the energy-saving mode setting information is transmitted to prescribed addresses, then the broadcast transmission in step S39 may be omitted.

In step S40, the CPU 207 requests the hardware-side power source controller 210 to stop power supply to modules implementing energy-saving mode, in order to switch to the energy-saving mode selected in step S32, and stops (i.e., energy-saving mode is executed).

The flowchart shown in FIG. 3C is one example of the process for switching to the energy-saving mode, and procedures such as selecting PCs to which to send energy-saving mode setting information are not limited by this. For example, PCs which are recipients of energy-saving mode setting information may be registered in the image forming apparatus ahead of time.

Figure 3D:
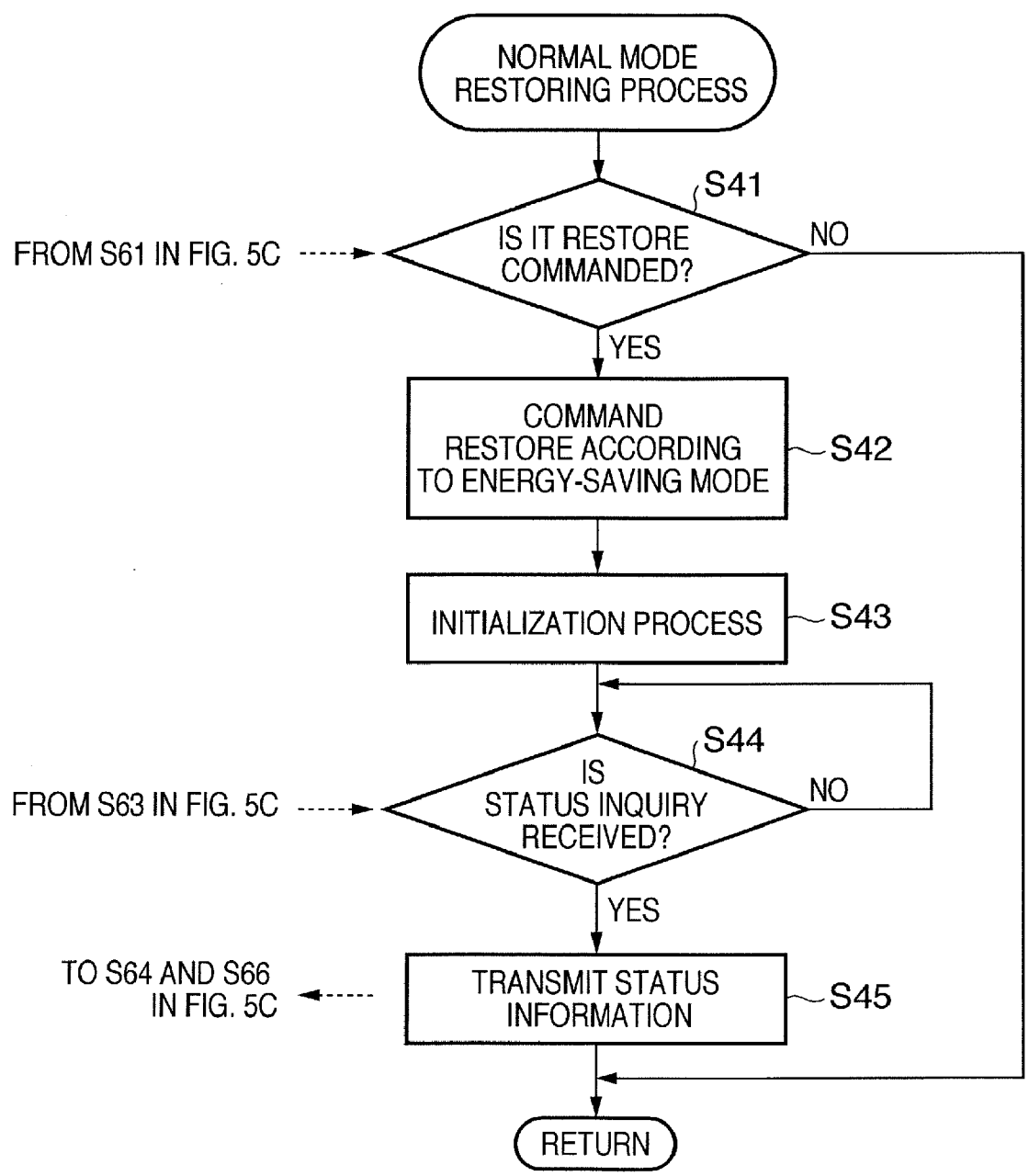
FIG. 3D is a flowchart for explaining a normal mode restoring process of the image forming apparatus shown in FIG. 1I

FIG. 3D is a flowchart showing a process for restoring from the energy-saving mode (a normal mode restoring process) of the image forming apparatus of the present embodiment. As shown in FIG. 2A, the process for restoring from the energy-saving mode is launched also by a local command from the touch panel 216 or the button 217 or by a restore time command from the RTC 213. However, in the present embodiment, a case in which the process for restoring from the energy-saving mode is launched by remote access from a PC via the network is described.

When the network controller 212 receives a self-addressed packet (including, for example, status inquiries, print jobs, etc.), it notifies the power source controller 210 that it has received a packet. Upon receiving a notification of packet reception from the network controller 212, the power source controller 210 determines whether or not it is a command (restore command) to restore from the energy-saving mode (step S41). Commands to restore from the energy-saving mode to modules in the apparatus in step S42 are performed by the power source controller 210 according to the energy-saving mode set in the energy-saving mode setting information 209c when switching to the energy-saving mode.

If the CPU 207 becomes operational while the process for restoring from the energy-saving mode is being performed on the modules by the power source controller 210 (i.e., resupply of power), then the restore command module 3015 begins its process. The CPU 207 responds to the restoring of power to the modules by performing an initialization process using the initialization module 3016 in step S43. The CPU 207 receives a status inquiry from a PC after the restore time transmitted to the PC via the network controller 212 when starting the energy-saving mode has elapsed (see step S63 in FIG. 5C), and therefore the process moves from step S44 to step S45. In other words, the CPU 207 determines whether or not a status inquiry has been received from a PC in step S44. The CPU 207 returns (transmits) a transmission message including the status information 209d to the PC in step S45 (see steps S64 and S66 in FIG. SC).

Constitution of a PC of the Present Embodiment

Figure 4A:
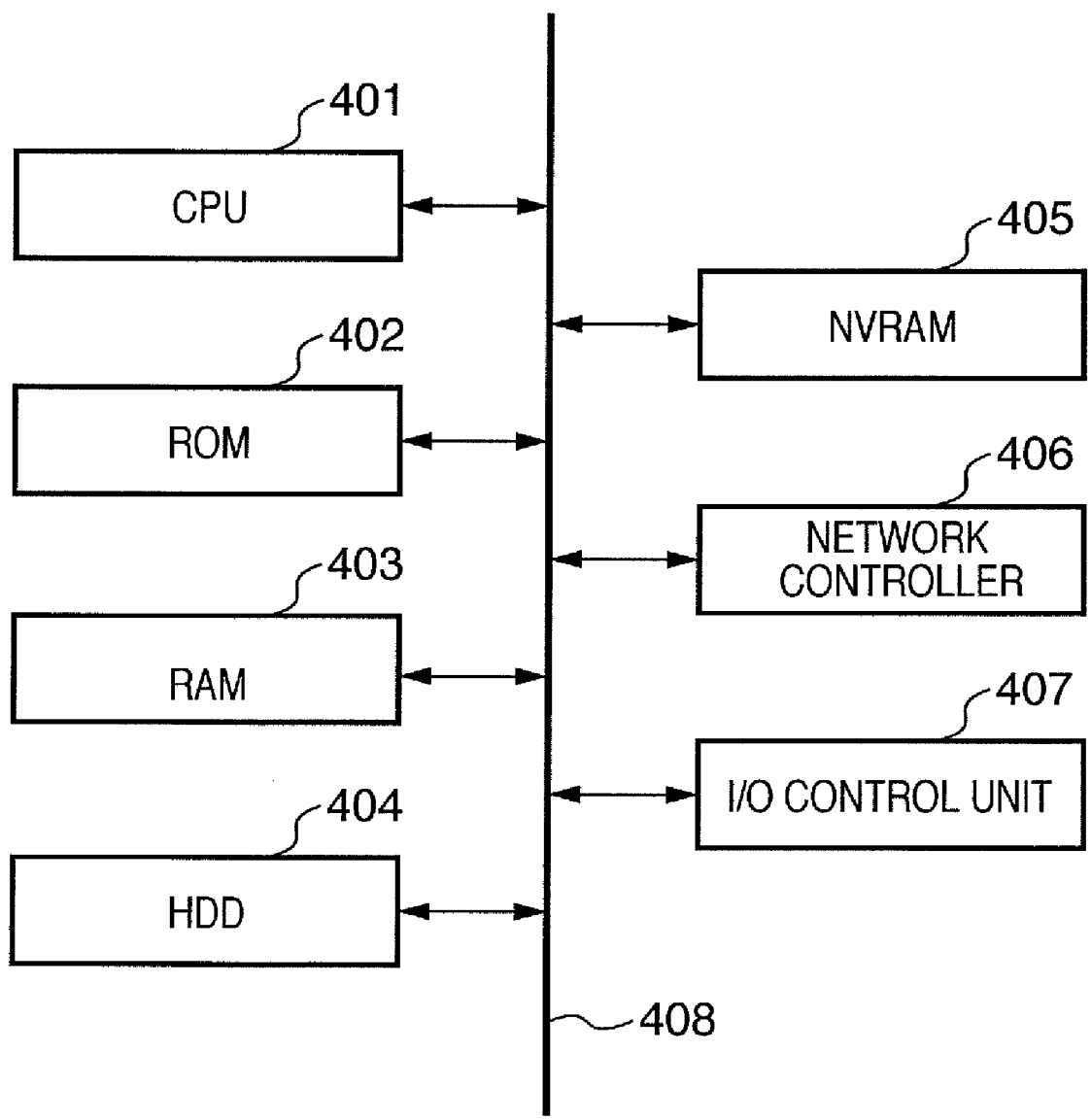
FIG. 4A is a schematic block diagram of hardware of the search/print client (PC) shown in FIG. 1.

FIG. 4A is a block diagram of a hardware constitution of an information processing apparatus (PC) acting as a search/print client in the present embodiment. Note that the information processing apparatus (PC) may be either a general-purpose computer or a specialized computer.

A CPU 401 is a CPU for computational control for controlling the PC by executing programs. A ROM 402 stores fixed programs such as a boot program and fixed parameters. A RAM 403 is used as a temporary storage portion by the CPU 207. A HDD 404 stores programs and data. An NVRAM 405 is a non-volatile RAM for holding values set through a panel, etc.

A network controller 406 controls communication via the network 100. An I/O control unit 407 controls a keyboard, a pointing device, a display screen, and other user interface portions. A bus 408 connects the above-mentioned elements.

Programs for controlling searching and printing processes are stored in the HDD 404, and when the power is turned on, the CPU 401 reads a boot program from the ROM 402 and executes a client boot process based on control from the boot program. The CPU 401 places client control programs from the HDD 404 in the RAM 403 based on the boot program, and controls the client by reading the control programs for the client placed in the RAM 403.

The PC stores the energy-saving mode setting information (including the energy-saving mode and the restore time thereof) transmitted by the image forming apparatuses connected to the same network before switching to the energy-saving mode in the NVRAM 405 for each device. When making device status inquiries or transmitting print jobs, etc., the PC stands by for the restore time stored in the NVPAM 405 after restoring from energy-saving mode begins, with regard to devices which have switched to the energy-saving mode. Then, after the restore time has elapsed, the PC makes the status inquiry or transmits the print job, etc. to devices which have restored. Transmission data is thus never lost on the image forming apparatus-side, allowing greater accuracy in data communication.

(PC Storage Constitution)

Figure 4B:
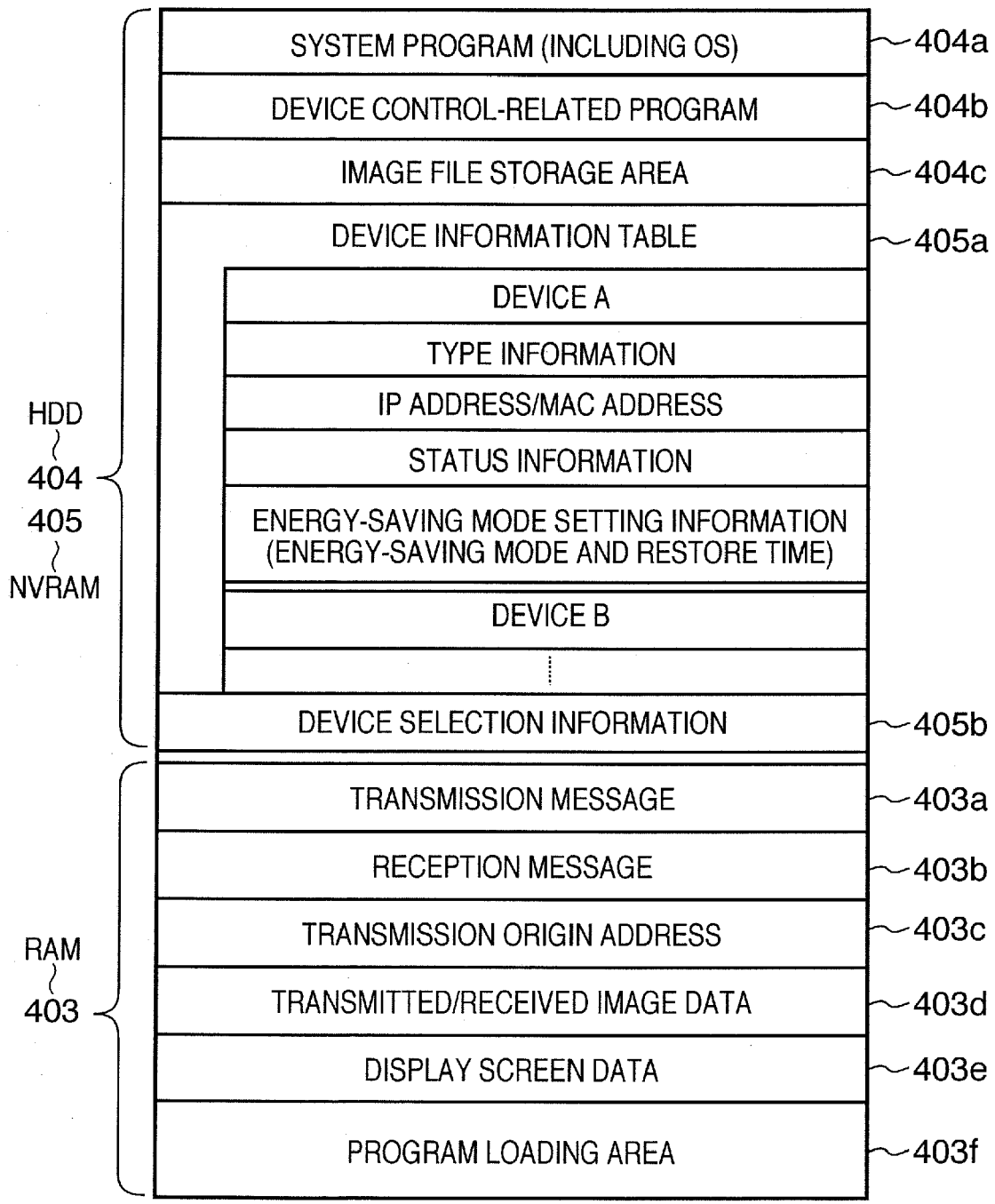
FIG. 4B is a schematic block diagram of a storage constitution of the memory shown in FIG. 4A.

FIG. 4B is a view of a storage constitution of the PC of the present embodiment. FIG. 4B shows information stored in the RAM 403, the HDD 404, and the NVRAM 405 shown in FIG. 4A. Note that in FIG. 4B, only programs and data related to the first and second embodiments are shown, while other programs and data are omitted. The arrangement of this information is not limited to the arrangement shown in FIG. 4B. Furthermore, the allocation to the RAM 403, the HDD 404, and the NVRAM 405 shown in FIG. 4B is only one example and not a limitation.

Figure 5A:
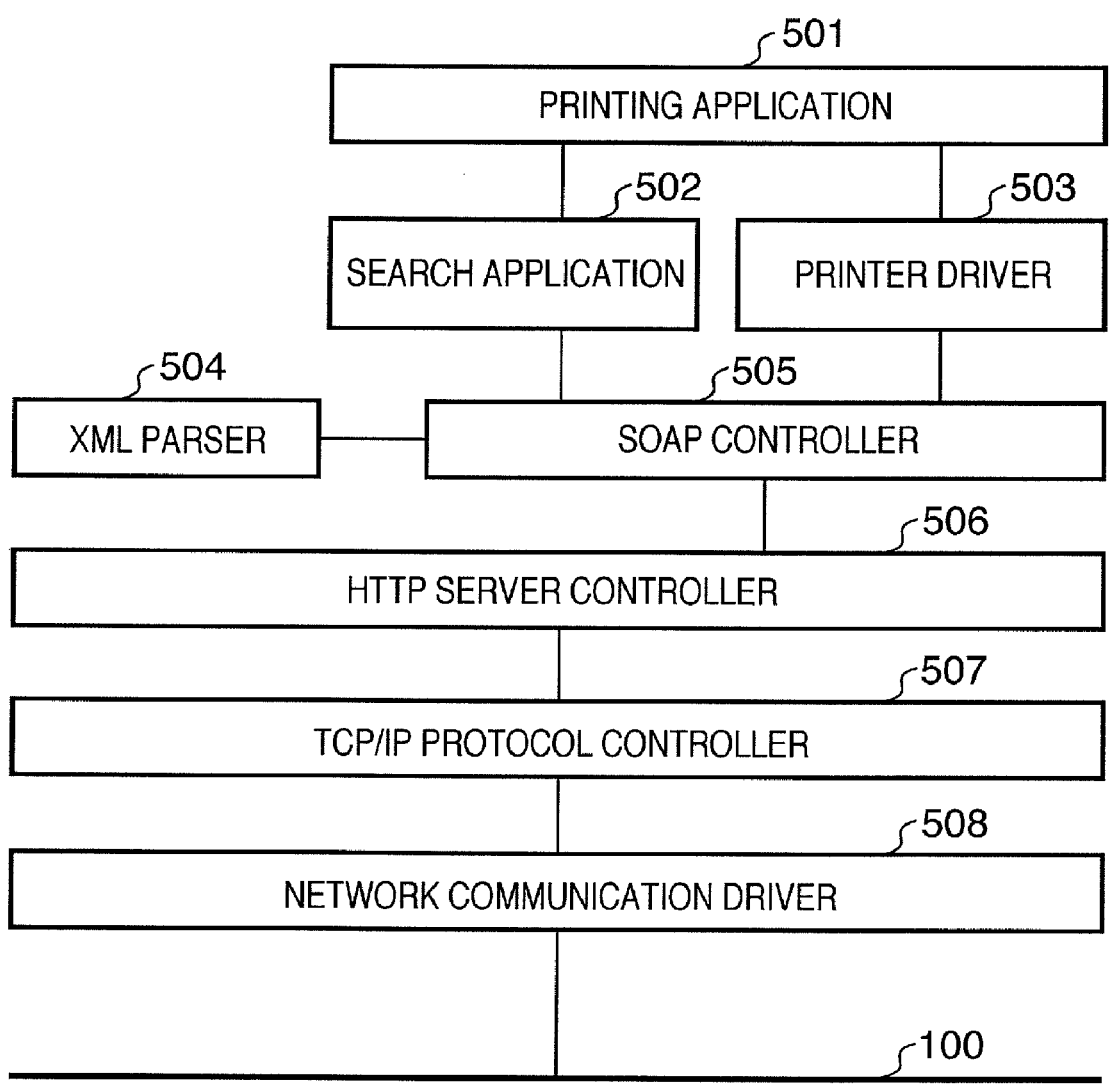
FIG. 5A is a schematic block diagram of software of the search/print client (PC) shown in FIG. 1.
Figure 5C:
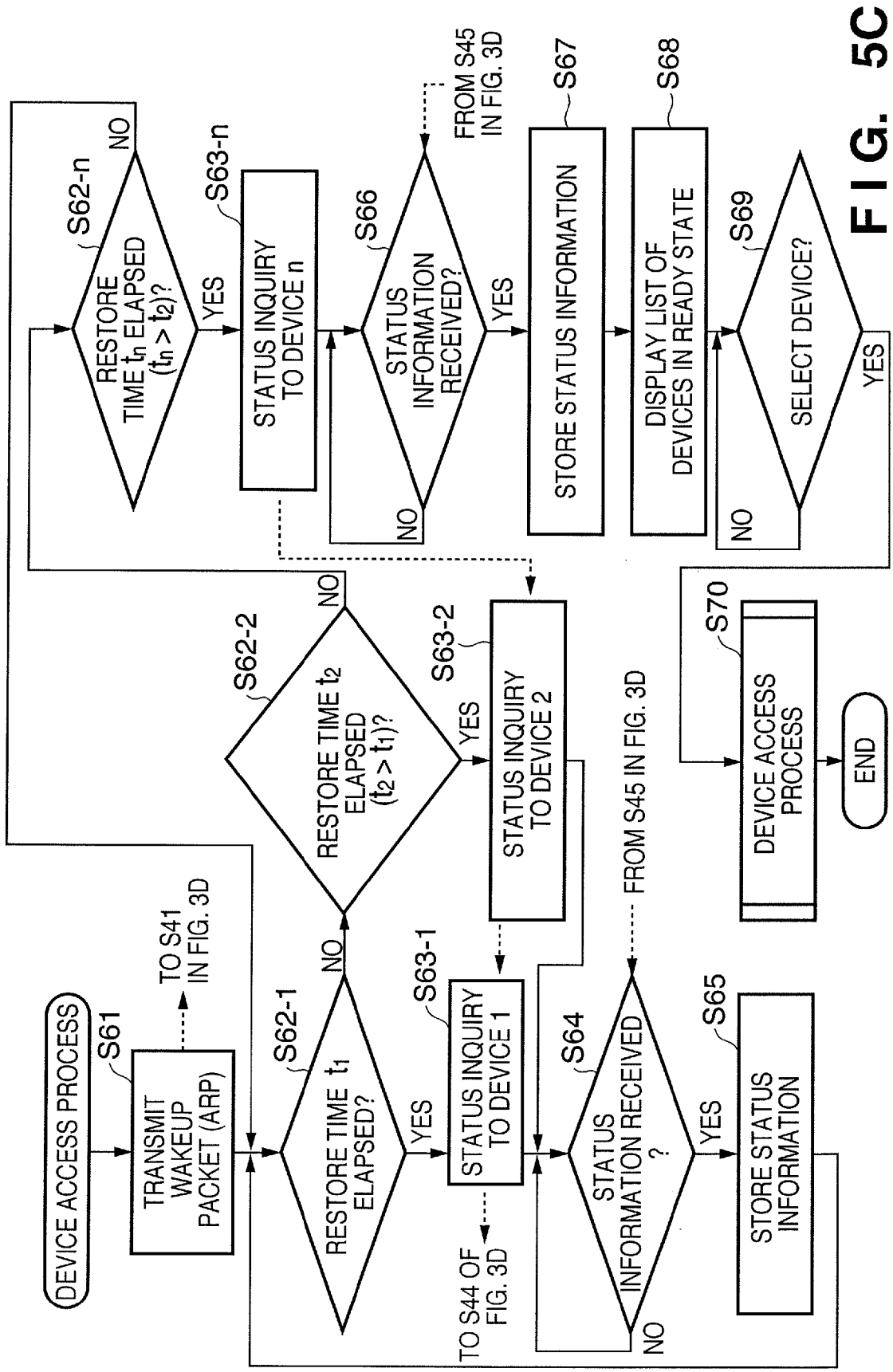
FIG. 5C is a flowchart for explaining a device access process of the search/print client (PC) shown in FIG. 1.

In FIG. 4B, 404a is system programs, including the OS and the like. 404b is programs related to device control executed by the CPU 401, the content whereof is shown in FIG. 5B and FIG. 5C. 404c is an image file storage area for holding image files to be processed by the PC.

405a is a device information table in which are stored addresses, statuses, and energy-saving mode setting information including restore times of devices including the image forming apparatuses connected to the PC via the network. The device information table 405a stores data such as device names, device type information, IP addresses and MAC addresses, device status information, and energy-saving mode setting information including restore times received from devices before switching to the energy-saving mode. 405b is device selection information in which are stored devices selected (manually or automatically) from the devices connected to the network. In the present embodiment, a list of image forming apparatuses having functionality allowing printing of image data to be printed, from among a plurality of image forming apparatuses, is displayed, from which list devices are selected by the operator or automatically by the PC.

403a is a transmission message transmitted as a packet from the PC to the image forming apparatus. 403b is a reception message transmitted as a packet from the image forming apparatus and received by the PC. 403c is a transmission origin address extracted from the reception message 403b, and held in the device information table 405a.

403d is transmitted/received image data transmitted/received between image forming apparatuses. 403e is display screen data such as device selection screens displayed to the display screen. 403f is a program loading area for loading programs executed by the CPU 401 from the HDD 402.

Operation of the Image Forming Apparatus of the Present Embodiment (Software Constitution of the Image Forming Apparatus)

FIG. 5A is a block diagram of a software constitution of a searching/printing client (PC) of the present embodiment.

A printing application 501 provides functionality searching for printers on the same network, selecting printers from the search results, and printing. Specifically, the printing application 501 searches for the most recent available printers using a search application 502 and performs a printing process after an available printer has been selected. This process sequence is described below using FIG. 6.

The printing application 501 further provides functionality for printing directly to already registered printers. The printing application 501 prints directly to known printers (without updating the list through a search). This process sequence is described below using FIG. 7.

Creation of print data is done via a printer driver 503, and transfer of the created data is done via a SOAP controller 505. Printer searches are done via the search application 502. The search application 502 holds the energy-saving mode setting information notified by the image forming apparatuses on the same network. The energy-saving mode setting information is not only used when the search application 502 performs a search operation, but is also provided to the SOAP controller 505. The SOAP controller 505 uses the energy-saving mode setting information for time-out judgments at the transmission destination. The printer driver 503 converts the print data passed from the printing application 501 into a PDL language processable by the printer which is the transmission destination and passes it to the SOAP controller 505.

A network communication driver 508 controls the network controller 406 thereby controlling data transmission/reception with the network. A TCP/IP protocol controller 507 includes modules for controlling TCP/IP protocol, and performs data transmission/reception control based on the TCP/IP protocol using the network communication driver 508. An HTTP server controller 506 is a module for controlling the entire protocol known as HTTP (HyperText Transfer Protocol). The HTTP server controller 506 performs appropriate processes by analyzing HTTP request packets received from clients and passes data to the SOAP controller 505, the search application 502, the printing application 501 or other upper-level applications. The HTTP server controller 506 performs control for returning to clients HTTP response packets through commands from the upper-level applications.

The SOAP controller 505 is a module for controlling a protocol known as SOAP (Simple Object Access Protocol). The SOAP controller 505 analyzes data in XML (extensible Markup Language) format received from clients using an XML parser 504, and calls appropriate modules, such as the printing application and the search application. The SOAP controller 505 performs control for converting data to be returned to clients into XML data and returning this to clients via the HTTP server controller 506. The XML parser 504 is a module for inputting XML-format data and outputting analysis results.

(Operation of the PC)

FIG. 5B is a flowchart showing a process in which the PC receives and stores energy-saving mode setting information from image forming apparatuses (an energy-saving mode setting information acquiring process).

First, in step S51, the CPU 401 determines via the network controller 406 whether or not a packet has been received from any of the image forming apparatuses connected to the network (see step S36 in FIG. 3C). If it is determined that no packets have been received, and then the process returns. If a packet is determined to have been received, the CPU 401 determines in step S52 whether or not the packet received in step S51 contains energy-saving mode setting information. If the packet received in step S51 is determined not to contain energy-saving mode setting information, the process returns and goes to another process.

If the packet received in step S51 is determined to contain energy-saving mode setting information, the process moves to step S53. In step S53, the CPU 401 stores the energy-saving mode setting information in the device information table 405a to match the device name, together with the device type, IP address, MAC address, and so on.

FIG. 5C is a flowchart showing a process by which the PC accesses the image forming apparatus (a device access process). Note that in the present embodiment, only access to image forming apparatuses which have switched into the energy-saving mode is described, but in reality, there exist image forming apparatuses which have not switched into the energy-saving mode. For image forming apparatuses which have not switched into the energy-saving mode, a status inquiry is made without standing by.

First, in step S61, the CPU 401 transmits a packet addressed to the image forming apparatuses to the network (see step S41 in FIG. 3D). This packet may be, for example, an ARP packet, a search packet in the SNMP protocol, a multicast packet in the SLP protocol, and so on, and is called a wakeup packet. The image forming apparatuses receiving the wakeup packet begin restoring from the energy-saving mode.

In steps S62-1 through S62-$n$, the CPU 401 determines whether or not the restore times t1 through tn have elapsed. In other words, the CPU 401 stands by for restore times t1 through tn. In the present embodiment, the plurality of devices which have switched to the energy-saving mode are designated as 1-$n$, and t1<t2<...<tn is assumed to be stored in the device information table 405a as the restore times.

After the restore times t1 through tn have elapsed, the CPU 401 makes a status inquiry to devices 1-$n$ in energy-saving mode having the restore times (steps S63-1 through S63-$n$). At the time of inquiry, the devices receiving the inquiries have restored from energy-saving mode unless there has been a malfunction, and are awaiting a process.

In step S64, the CPU 401 determines whether or not status information, which is the response from the devices, has been received. In other words, the CPU 401 waits for reception of status information. If status information is received, in step S65 the status information is stored in the device information table. Once status information is received from the last device with the longest restore time (step S66) and the storing of the status information (step S67) is complete, in step S68 a list of devices in a ready state is displayed. In this list is also displayed at the same time the performance, functions, types of installed optional parts, and so on for each device.

In step S69, the CPU 401 determines whether or not a device to be used has been selected by the operator. In other words, the CPU 401 waits for selection of a device to be used, and in step S70 gives a command to access the selected device (device access process). In the present embodiment, the device access process gives a command to print an image or read an image. Note also that the selection of the device may be done not only manually by the operator, but also automatically by the PC, based on the image data type and device performance.

Operation Sequence of the System of the Present Embodiment (Example of Selection of Image Forming Apparatus)

FIG. 6 shows a sequence in a case in which each image forming apparatus notifies the energy-saving mode setting information and sleep restore times to client apparatuses before switching to the energy-saving mode, and the client apparatuses change the time out times when searching for apparatuses based on the notified information from the image forming apparatus. Here, the time out time is the standby time until the status inquiry.

In steps S601 to S604, the image forming apparatuses 101 and 102 notify information (energy-saving mode setting information) related to energy-saving mode of each apparatus to the client apparatus 103 when switching into the energy-saving mode. The notification method uses a method for notifying based on addresses already registered in the image forming apparatuses or a method for notifying a plurality of PCs on the network by broadcasting.

When the image forming apparatus needs to be used, the search application 502 transmits in step S605 the wakeup packet (ARP) based on a request from the printing application 501. In other words, the search application 502 causes the image forming apparatuses 101 and 102 on the network to begin the normal mode restoring process (steps S607 and S608). In step S606, the search application 502 stands by the restore time from the energy-saving mode notified for each search target apparatus based on energy-saving mode setting information 800 notified by the image forming apparatuses in steps S601 through S604. Furthermore, the search application 502 transmits the message 900 for verifying the status of each apparatus and acquires the latest status (steps S609 and S611).

In step S610, the search application 502 determines an apparatus is present when a response message 910 is returned, but if there is no response, it determines that the apparatus has timed out (i.e., the apparatus has disappeared from the network), and updates the apparatus list. The client apparatus 103 selects the image forming apparatus 101 which requests the printing process in step S612 based on the results up to step S611, and creates the print data in step S613. The client apparatus 103 also transmits the print data created in step S613. In step S615, the image forming apparatus 101 selected in step S612 executes the printing process based on the print data received from the client apparatus 103.

(Example of Known Image Forming Apparatus)

FIG. 7 shows a sequence in a case in which the printing application prints, taking into consideration the energy-saving mode setting information from the image forming apparatus. Referring to FIG. 7, as in the case shown in FIG. 6, when switching to the energy-saving mode, the image forming apparatus 101 notifies the information regarding the energy-saving mode of the image forming apparatus (energy-saving mode setting information) to the client apparatus 103 (steps S701 and S702). The notification method uses a method for notifying based on addresses already registered in the image forming apparatuses or a method for notifying a plurality of PCs on the network by broadcasting.

When use of the image forming apparatus 101 is requested, in step S703 the printing application 501 creates the print data and causes the search application 502 to make an inquiry about information on the current energy-saving mode of the image forming apparatus 101 which is requesting the printing. Note also that the time out time when transmitting the data is set longer than the restore process time from the energy-saving mode notified beforehand by the image forming apparatus 101 (adjustment of time out process time).

In step S704, the client apparatus 103 begins transmission of the print data. The transmission of the print data triggers the image forming apparatus 101 to start the process of restoring from the energy-saving mode (step S705). However, the transmission process itself of the print data repeatedly encounters connection errors, and the process moves to step S706 and step S707 once the process of restoring from the energy-saving mode by the image forming apparatus 101 is complete.

In step S706, the reception complete notice for the print data is returned to the client apparatus 103 from the image forming apparatus 101, and in step S707, the image forming apparatus 101 executes the printing process based on the print data received from the client apparatus 103.

By adjusting the time out time based on the energy-saving mode setting information notified beforehand in this way, the printing application can avoid determining that an image forming apparatus which is actually present has timed out.

(Constitution of Messages Transmitted/Received on the Network)

FIG. 8 shows an example of a notification message when the image forming apparatus notifies its own energy-saving mode setting information to the client apparatus (PC).

Before switching to the energy-saving mode, the image forming apparatus notifies the energy-saving mode setting information 800, which is a notification message pertaining to the current energy-saving mode, to the client apparatuses which have used it in the past, and then switches to the energy-saving mode. The client apparatus returns a response (message) 810 to the image forming apparatus. The energy-saving mode setting information 800 is constituted by data 801 indicating user settings set by the user, data 802 indicating options for disabling the energy-saving settings, and data 803 indicating the fixed energy-saving performance for each model.

The data 801 indicating user settings includes sleep_level, the selectable energy-saving level; fui_wtime, the length of time during which the operation panel on the apparatus is not used, which is the condition for switching to energy-saving mode; net_wtime, the length of time during which the apparatus is not used via the network; and the like. The data 802 indicating options lists factors which would cause the energy-saving mode to be disabled such as attachment of fax boards, etc., only if there are such factors. The data 803 indicating the energy-saving performance lists wake_up_time, the time needed for the apparatus to restore from energy-saving mode; and allowed_sleep_level, the energy-saving mode level which can be set. After receiving the energy-saving mode setting information 800, the search application 502 returns the response (message) 810 thereto, thereby notifying the image forming apparatus that reception is complete.

FIG. 9 shows examples of a message 900 transmitted when the printing application 501 and the search application 502 inquire about the current status with the image forming apparatus, and a status notice (response message) 910 from the image forming apparatus in reply.

The client (PC) side designates the status information to be verified with data 901 in the message 900 for status acquisition (inquiry) The image forming apparatus stores the content specified by the data 901 as data 911, and returns the status notice 910.

FIG. 10 shows a SOAP/XML message when the printing application requests a printing process to the image forming apparatus.

The client apparatus selects the image forming apparatus to which to transmit data ahead of time and transmits a SOAP/XML message 1000. The SOAP/XML message 1000 is transmitted in the SOAP Messages with Attachment format. The SOAP/XML message 1000 includes data 1001 indicating the network information for the printer which is the printing destination and data 1002 indicating the print data and the reference pointer to signature data for the print data. The SOAP/XML data further includes data 1003 in which the data designated in the data 1002 is encoded in a MIME format. The image forming apparatus acquires the print data of the data 1003 and performs the printing process after verifying the signature.

As described above, in the present embodiment an image forming apparatus having a relatively long restore time from the energy-saving mode and a plurality of energy-saving modes with differing restore times was described as a typical apparatus having an energy-saving mode. However, the present invention may be applicable to other apparatuses having energy-saving modes and still provide the same effect.

The object of the present invention is to provide a system or apparatus with a storing medium in which is stored program code of software for realizing the functionality of the embodiments. This may also be achieved through the computer of the system or apparatus (or CPU, MPU, etc.) reading and executing the program code stored in the storage medium.

In this case, the program code read from the storage medium itself realizes the functionality of the embodiments described above, and the program code and the storage medium in which is stored the program code constitute the present invention.

Moreover, as a storage medium for providing the program code, floppy (registered trademark) disks, hard disks, magnetooptical disks, CDs, DVDs, magnetic tape, non-volatile memory cards, ROMs, and the like may be used. CDs and DVDs which can be used include CD-ROMs, CD-Rs, CD- RWs, DVD-ROMS, DVD-RAMS, DVD-RWS, and DVD-RWs. The program code may also be downloaded via a network.

Not only is the functionality of the above embodiments realized by executing the program code read by the computer. Cases are also included in which the OS (operating system), etc., running on the computer performs all or part of the actual processes based on the instructions of the program code, the functionality of the embodiments described above thereby being realized by these processes.

In this case, the program described above is provided directly from the storage medium in which is stored the program. Furthermore, the program is also provided by being downloaded from other computers and databases, etc., not shown in the drawings, connected to the Internet, commercial networks, or local area networks, etc.

The program code read from the storage medium is written into memory provided to a function enhancing board inserted into the computer or a function enhancing unit connected to the computer. A case is also included in which a CPU, etc., provided to the function enhancing board or the function enhancing unit performs all or part of the actual processes based on the instructions of the program code and the functionality of the embodiments described above is thereby realized.

The format of the program described above may be object code, program code executed by an interpreter, or script data provided to an OS (operating system), etc.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese application No. 2006-118440 filed on Apr. 21, 2006, which is hereby incorporated by reference herein in its entirely.

What is claimed is:

1. An information processing apparatus comprising:
a receiving unit for receiving an information for specifying a restore time from an energy-saving mode from an energy-saving mode-equipped apparatus having the energy-saving mode for limiting power supply to a module,
a storage unit for storing the restore time from the energy-saving mode of the energy-saving mode-equipped apparatus based on the information received by the receiving unit,
a first transmitting unit for transmitting data to the energy-saving mode-equipped apparatus, and
a second transmitting unit for transmitting a processing request to the energy-saving mode-equipped apparatus based on the restore time from the energy-saving mode stored in the storage unit after the data was transmitted by the first transmitting unit.

2. The information processing apparatus according to claim 1, wherein the processing request is a request for inquiring a status of the energy-saving mode-equipped apparatus.

3. The information processing apparatus according to claim 1, wherein the processing request is an image formation request.

4. The information processing apparatus according to claim 1, wherein the second transmitting unit repeatedly transmits the processing request to the energy-saving mode-equipped apparatus via a network until after the restore time has elapsed since the data was transmitted by the first transmitting unit.

5. The information processing apparatus according to claim 1, further comprising:
a list display unit for displaying a list of available apparatuses based on statuses returned from a plurality of apparatuses including the energy-saving mode-equipped apparatus, and
a process requesting unit for requesting a processing start to a selected apparatus in response to a selection command by a user from the list.

6. The information processing apparatus according to claim 1, wherein data transmitted by the first transmitting unit is data commanding the energy-saving mode-equipped apparatus to restore from the energy-saving mode.

7. The information processing apparatus according to claim 1, wherein the storage unit stores restore times corresponding to each of a plurality of energy-saving mode-equipped apparatuses.

8. The information processing apparatus according to claim 1, wherein the information processing apparatus includes a personal computer.

9. A control method for an information processing apparatus comprising:
a receiving step of receiving an information for specifying a restore time from an energy-saving mode from an energy-saving mode-equipped apparatus having the energy-saving mode for limiting power supply to a module,
a storage step of storing the restore time from the energy-saving mode of the energy-saving mode-equipped apparatus based on the information received in the receiving step,
a first transmitting step of transmitting data to the energy-saving mode-equipped apparatus, and
a second transmitting step of transmitting a processing request to the energy-saving mode-equipped apparatus based on the restore time from the energy saving mode stored in the storage step after the data was transmitted in the first transmitting step.

* * * * *